United States Patent [19]

Yoshimoto

[11] Patent Number: 5,132,603
[45] Date of Patent: Jul. 21, 1992

[54] STEPPING MOTOR

[75] Inventor: Satoshi Yoshimoto, Komaki, Japan

[73] Assignee: Brother Kogyo Kabushiki Kaisha, Nagoya, Japan

[21] Appl. No.: 600,184

[22] Filed: Oct. 19, 1990

[30] Foreign Application Priority Data

Oct. 25, 1989 [JP] Japan .................. 1-278111

[51] Int. Cl.$^5$ .................................. H02P 8/00
[52] U.S. Cl. ................................ 318/696; 318/685; 310/257; 310/49 R
[58] Field of Search ............... 318/696, 685; 310/257, 310/49 R

[56] References Cited

U.S. PATENT DOCUMENTS 4,794,292 12/1988 Torisawa .................. 310/257
4,952,859 8/1990 Torisawa .................. 318/696

FOREIGN PATENT DOCUMENTS 0257473 3/1988 European Pat. Off. .
2016225 9/1979 United Kingdom .

Primary Examiner—William M. Shoop, Jr.
Assistant Examiner—Saul M. Bergmann
Attorney, Agent, or Firm—Jones, Tullar & Cooper

[57] ABSTRACT

A stepping motor comprises a rotor, a stator, coils for magnetizing the stator, and a controller for controlling the excitation of the coils to control the rotation of the rotor. The rotor is cylindrical and has a multiplicity of alternately arranged north and south poles. The stator has a plurality of stator teeth arranged about the rotor. The controller is arranged to rotate the rotor a predetermined amount to a selected stop position and then determine whether to maintain the excitation of the coils or to inhibit the excitation of the coils based upon the relative position between the stator teeth and the rotor poles in the stop position.

14 Claims, 6 Drawing Sheets

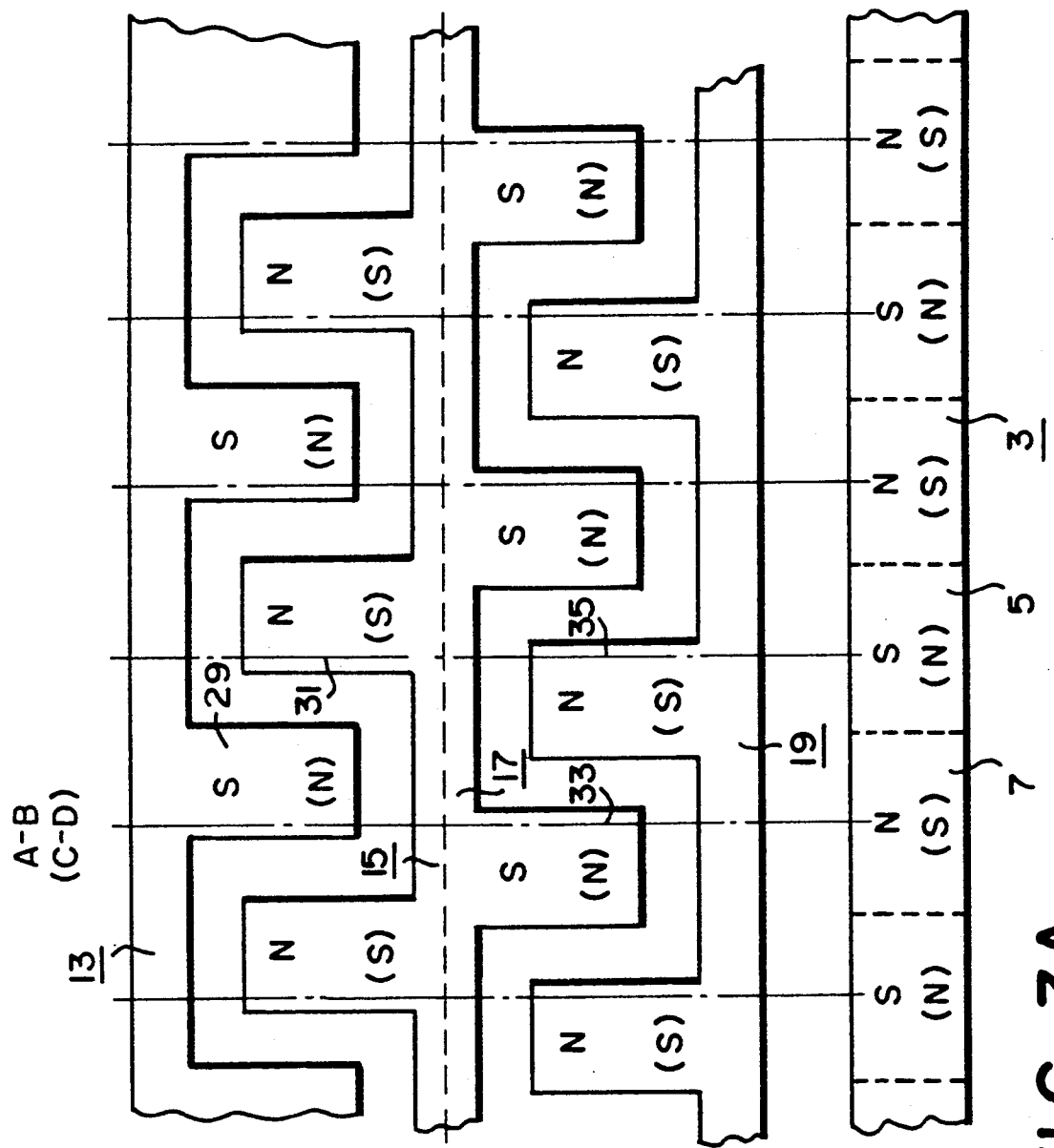

STEPPING MOTOR

BACKGROUND OF THE INVENTION

1. Field of the Invention

The present invention relates generally to a stepping motor. More particularly, an improved control system for a stepping motor is disclosed.

2. Description of the Related Art

In general, there is known a stepping motor which includes a rotatable rotor having a permanent magnet, stators arranged around the rotor, and induction coils for magnetizing the stators to form N pole or S pole. Some designs have been proposed that stop excitation of the induction coils to prevent the stepping motor from being heated when the rotor stops rotating (at the waiting time) with the motor connected to a power source.

In such designs, the magnetic interaction between the rotor and stator often depends on the relative positioning of the rotor and stator. Thus, if the induction coils are not maintained in the energized state, the rotor cannot stably be stopped at the desired position. Accordingly, it is not possible to restrict the stop position of the rotor with high precision when the coils are deenergized. This hinders fine control of the amount of rotation of the rotor of this motor.

To overcome such a shortcoming, many stepping motors always keep exciting the induction coils even at the waiting time. In order to suppress the heating of the motor at the waiting time as much as possible and prevent unnecessary power consumption, some designs supply a current lower than normal to the induction coils during the waiting time.

In this case, however, since the magnetization of the stators is weaken in accordance with the amount of the current supplied to the induction coils for their excitation, the magnetic balance between the rotor and stators differs from that of the case where the rotor is rotating. It is difficult to sufficiently enhance the accuracy of the position at which the rotor should be stopped.

SUMMARY OF THE INVENTION

Accordingly, it is a primary object of the present invention to provide a stepping motor which can accurately stop the rotor at a predetermined position to finely control the amount of rotation of the rotor, yet reduce power consumption during the waiting time.

To achieve the foregoing and other objects and in accordance with the purpose of the present invention, there is provided a novel and improved stepping motor comprising a rotor, a stator, coils for magnetizing the stator and a controller for controlling the excitation of the coils to control the rotation of the rotor.

The rotor is cylindrical and has a multiplicity of alternately arranged north and south poles. The stator has a plurality of stator teeth arranged about the rotor. The controller is arranged to rotate the rotor a predetermined amount to a selected stop position and then determine whether to maintain the excitation of the coils or to inhibit the excitation of the coils based upon the relative position between the stator teeth and the rotor poles in the stop position.

BRIEF DESCRIPTION OF THE DRAWINGS

The features of the present invention that are believed to be novel are set forth with particularity in the appended claims. This invention, together with the objects and advantages thereof, may best be understood by reference to the following description of the presently preferred embodiments and the accompanying drawings of which:

FIGS. 3A and 3B are diagrams illustrating the positional relation between a rotor and stator at the time the rotor is stopped;

DETAILED DESCRIPTION OF THE PREFERRED EMBODIMENT

A preferred embodiment of the present invention will now be described referring to the accompanying drawings.

Figure 1:
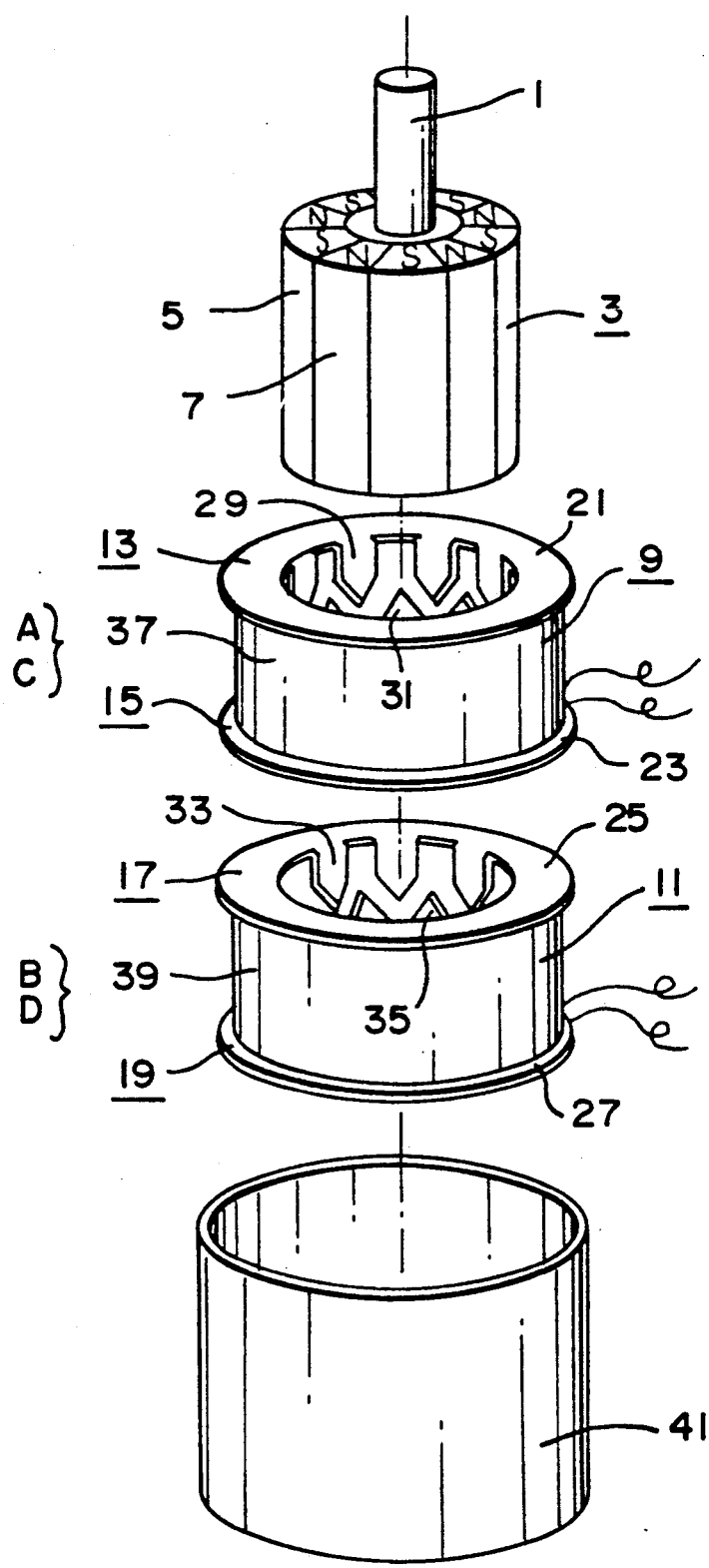
FIG. 1 is an exploded perspective view illustrating the structure of a stepping motor.

As illustrated in FIG. 1, a cylindrical rotor 3 comprising a permanent magnet is integrally secured on a rotor shaft 1 of a stepping motor. The rotor 3 has a plurality of portions 5 that are magnetized to form S poles and a plurality of portions 7 magnetized to form N poles. The north and south poles are alternately arranged at equal intervals in the circumferential direction. A pair of stators 9 and 11 are also provided. The rotor 3 and stators 9 and 11 are disposed in a casing 41 with the rotor 3 being rotatably mounted. The stators 9 and 11 are journaled about the rotor so as to form a predetermined gap between the stator and the outer wall of the rotor 3.

The stator 9 has magnetic poles 13 and 15 at its upper and lower ends respectively while the stator 11 has similar magnetic poles 17 and 19. These magnetic poles are made of a press-molded ferromagnetic steel. The magnetic poles 13, 15, 17 and 19 respectively have annular bases 21, 23, 25, and 27, and multiple stator teeth 29, 31, 33, and 35 which extend in parallel to the rotor shaft 1 and are arranged at equal circumferential intervals about the rotor. The stator teeth 29 and 33 project downward from the magnetic poles 13 and 17, respectively, while the stator teeth 31 and 35 project upward from the magnetic poles 15 and 19, respectively. The stator teeth 29 and 31, and the stator teeth 33 and 35 are arranged alternately.

Each of the magnetic poles 13, 15, 17 or 19 has the same number of the stator teeth 29, 31, 33, or 35. Given that n is the number of stator teeth, the stator teeth 29 are displaced by 360/4 n degrees (°) from the stator teeth 33 in the rotating direction of the rotor 3. Likewise, the stator teeth 31 are displaced by 360/4 n degrees (°) from the stator teeth 35 in the rotating direction of the rotor 3. The same spacing exists between stator teeth 33 and the stator teeth 31, as well as between the stator teeth 35 and the stator teeth 29.

As shown in FIG. 1, the stator 9 has an induction coil 37 located between the magnetic pole pair 13 and 15 to excite the magnetic poles. Similarly, the stator 11 has an induction coil 39 located between the magnetic pole pair 17 and 19 to excite the magnetic poles. The magnetic poles 13, 15, 17, and 19 and the inner surface of the casing 41 form a magnetic path.

Each of the induction coils 37 and 39 comprises two coils bifilar-wound in the circumferential direction of the associated stator 9 or 11. Each pair of coils has a different exciting direction. The stepping motor, therefore, includes four coils in total. These coils are hereinafter referred to as coil A, coil B, coil C, and coil D according to the order of the excitation at the time of driving the stepping motor. In this embodiment, the stator 9 has the coils A and C, while the stator 11 has the coil B and D. Further, the coils A and B are excited in the same direction, and the coils C and D are excited in the opposite direction to the exciting direction of the coils A and B.

Assuming that only the coil A is excited, the two magnetic poles 13 and 15 of the stator 9 are magnetized to mutually different (magnetic) poles in accordance with the winding direction of the coil A. In the following description, it is assumed that, when the coil A is excited, the upper magnetic pole 13 of the stator 9 is magnetized to the S pole, and the lower magnetic pole 15 to the N pole. When the coil B is excited, which has the same exciting direction as the coil A, the upper magnetic pole 17 of the stator 11 is magnetized to the S pole, and the lower magnetic pole 19 to the N pole.

Since the coils C and D have exciting directions opposite to those of the coils A and B, when only the coil C is excited instead of the coil A, the magnetic pole 13 is magnetized to the N pole, and the magnetic pole 15 to the S pole. Upon excitation of the coil D, the magnetic pole 17 is magnetized to the N pole, and the magnetic pole 19 to the S pole (see the following table).

|  | Magnetic Pole 13 | Magnetic Pole 15 |
| --- | --- | --- |
| Coil A Excited | S Pole | N pole |
| Coil C Excited | N pole | S pole |

|  | Magnetic Pole 17 | Magnetic Pole 19 |
| --- | --- | --- |
| Coil B Excited | S Pole | N pole |
| Coil D Excited | N pole | S pole |

When the individual magnetic poles 13, 15, 17 and 19 are magnetized to the N pole or S pole, the respective stator teeth 29, 31, 33 and 35, each being part of the associated magnetic pole, are each magnetized to the same pole as the associated magnetic pole.

Figure 2:
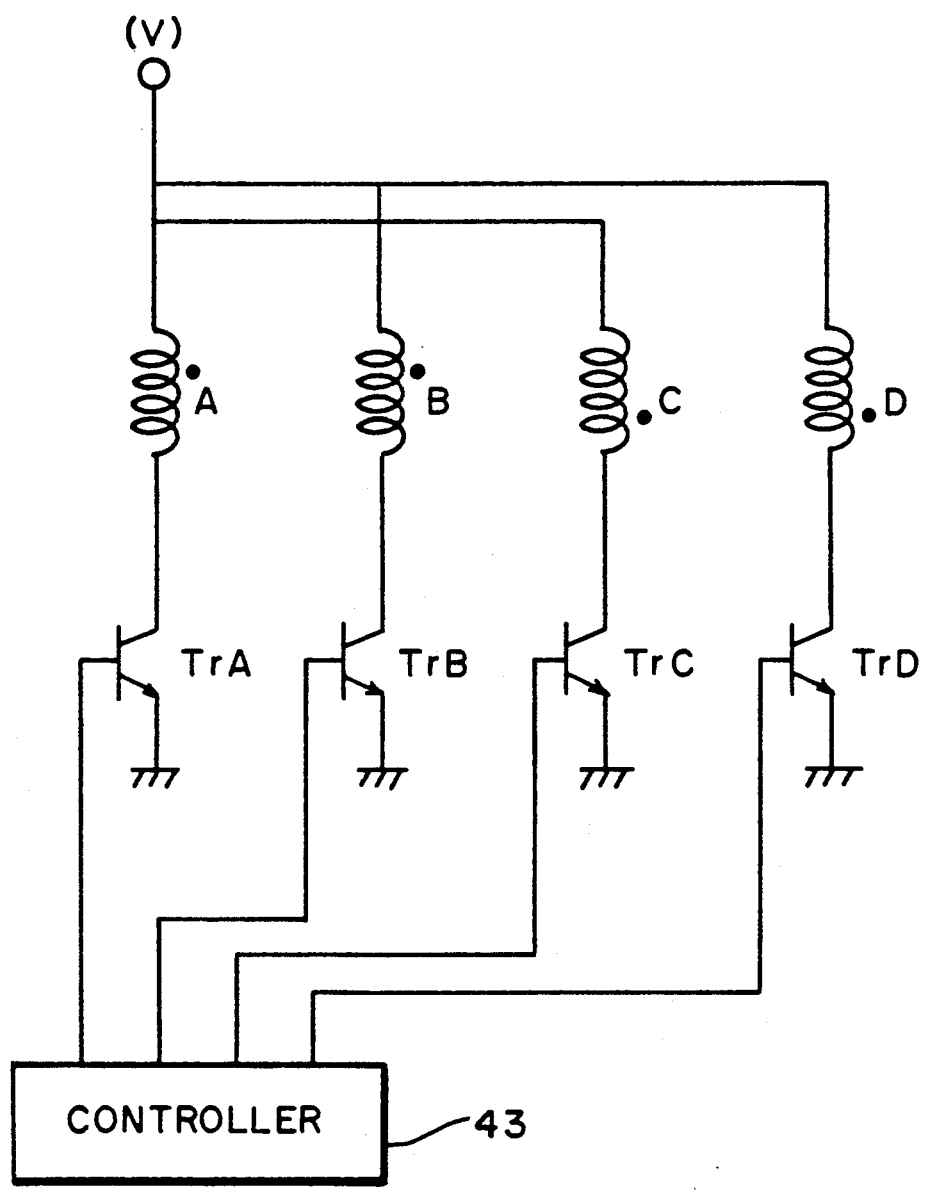
FIG. 2 is a circuit showing a drive circuit for a stepping motor.

A drive circuit for the stepping motor will be described below. As shown in FIG. 2, the individual coils A, B, C and D are connected in parallel to a power source V, and connected in series to transistors TrA, TrB, TrC and TrD, respectively. The individual transistors TrA to TrD have their bases connected to a controller 43 which controls the operation of the stepping motor. In this drive circuit, when the controller 43 sends a control signal to the base of each transistor, that transistor is rendered conductive, exciting the associated coil.

This stepping motor is driven by a two-phase exciting method. That is, with TrA and TrB, TrB and TrC, TrC and TrD, and TrD and TrA being pairs, the controller 43 sends control signals to these transistor pairs in the named order. The transistor pairs are sequentially driven in response to the received control signals. As a result, the coils A and B, coils B and C, coils C and D, and coils D and A are sequentially excited in the named order. Hereinafter, coil pair A and B will be expressed as "A-B"; the same nomenclature will be applied to the other coil pairs.

Figure 3B:
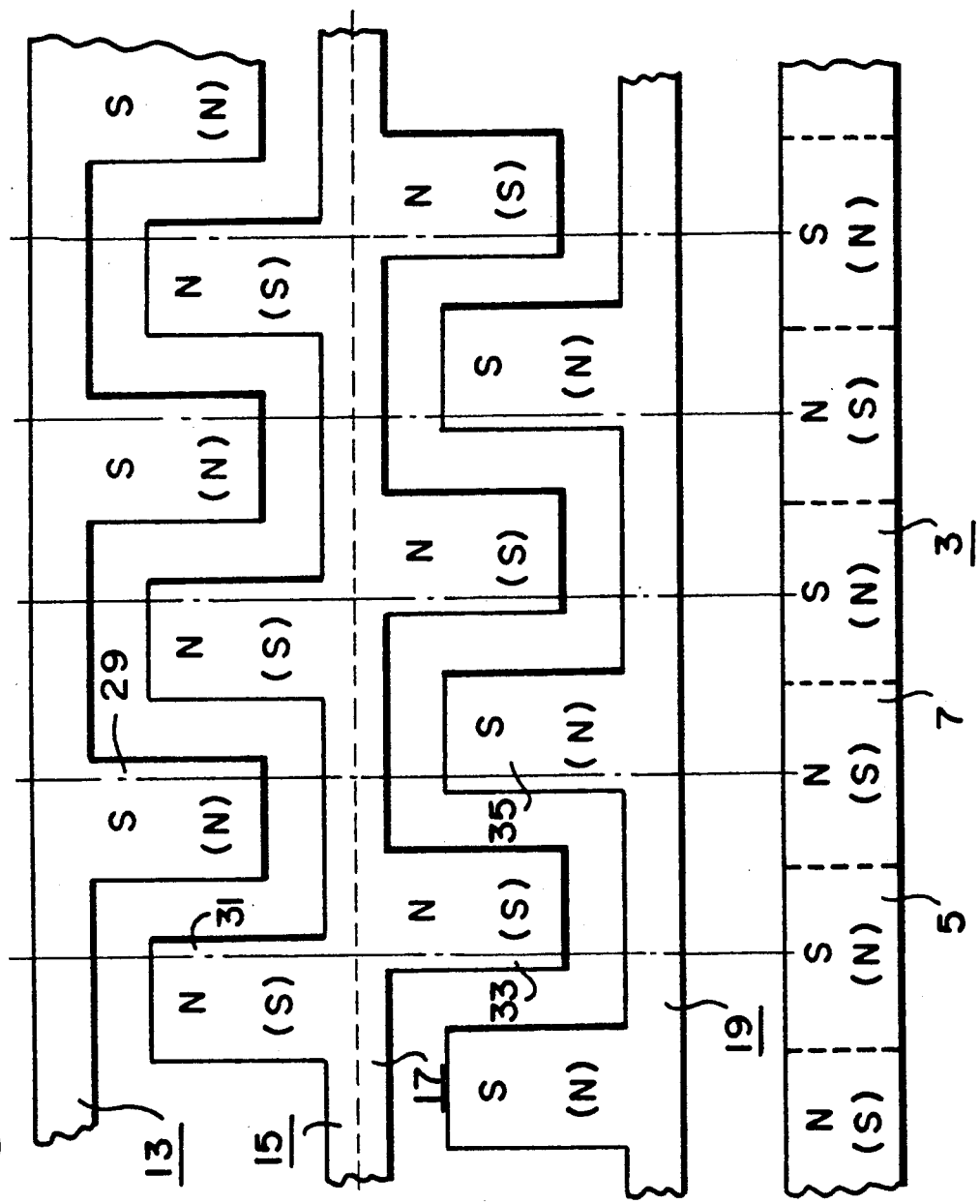

A description will now be given of the control performed during the waiting time of the stepping motor, i.e., when the rotor is not rotating. FIGS. 3A and 3B illustrate the mutual relation between the individual S pole portions 5 and N pole portions 7, and the stator teeth 29, 31, 33 and 35, and the stable position (stop position) of the rotor 3 in a case where the stepping motor is controlled by a two-phase exciting method. Particularly, FIG. 3A illustrates that the coils A and B are excited or coils C and D are excited. As the former case of exciting the coils A and B differs from the latter case of exciting the coils C and D only in that the polarities of the individual stator teeth 29, 31, 33 and 35 are reversed, the former case will be primarily described.

When the coils A and B are simultaneously excited, the stator teeth 29 and 33 are magnetized to the S pole, and the stator teeth 31 and 35 to the N pole in accordance with magnetization of the magnetic poles 13, 15, 17 and 19. Referring to FIG. 3A, the polarity of each stator tooth with the coils C and D excited is shown within the parentheses.

The S pole portions 5 of the rotor 3 are then moved to evenly face both stator teeth 31 and 35 magnetized to the N pole, the rotor 3 stopping there. At this time, the N pole portions 7 of the rotor 3 likewise face the stator teeth 29 and 33 magnetized to the S pole.

As long as the coils A and B are excited, the rotor 3 is stably held at the aforementioned position. Cutting off the excitation of the coils A and B, however, causes the rotor 3 to rotate to a more stable position as shown in FIG. 3B for the following reason. When both magnetic poles 15 and 17 are magnetized by the coils A and B, the stator teeth 31 and 33 have different polarities. When the excitation of the coils A and B is inhibited, the individual stator teeth 29, 31, 33 and 35 are magnetized by the magnetic force of the rotor 3.

Since the magnetic pole 15 and the magnetic pole 17 are in contact with each other to magnetically become one, it is not easy to magnetize the stator teeth 31 and 33 to different poles by the S pole portions 5 and the N pole portions 7 of the rotor 3. The magnetic reaction produces a rotational moment on the rotor 3. Shutting off the excitation of the coils A and B, therefore, renders the rotor 3 unstable at the position shown in FIG.3A, and causes it to rotate to a more stable position. The same phenomenon occurs when the coils C and D are excited.

FIG. 3B illustrates that the coils B and C are excited or coils D and A are excited. As the former case of exciting the coils B and C differs from the latter case of exciting the coils D and A only in that the polarities of the individual stator teeth 29, 31, 33 and 35 are inverted, the latter case will be mainly described.

When the coils D and A are simultaneously excited, the stator teeth 29 and 35 are magnetized to the S pole, and the stator teeth 31 and 33 to the N pole in accordance with magnetization of the magnetic poles 13, 15, 17 and 19. Referring to FIG. 3B, the polarity of each stator tooth with the coils B and C excited is shown within the parentheses.

The S pole portions 5 of the rotor 3 are then moved to evenly face both stator teeth 31 and 33 magnetized to the N pole, the rotor 3 stopping there. At this time, the N pole portions 7 of the rotor 3 likewise face the stator teeth 29 and 35 magnetized to the S pole. In other words, the S pole portions 5 of the rotor 3 come to a midpoint between the stator teeth 31 and the stator teeth 33, and the N pole portions 7 come to a midpoint between the stator teeth 29 and the stator teeth 35.

In this situation, even if the excitation of the coils D and A is inhibited, the rotor 3 will remain in place. This is because the stators 15 and 17, which are magnetically one body as described earlier, are magnetized to the same polarity and that the individual stator teeth 31 and 33 of these stators 15 and 17 face the S pole portions 5 of the rotor 3. Even when the excitation of the coils D and A is cut off, therefore, the stator teeth 31 and 33 are easily magnetized by the S pole portions of the rotor 3. Thus, no magnetic-reaction originating rotational moments are induced on the rotor 3.

In this stepping motor, there are two combinations of coil excitation. The first is the coil excitation (B-C, D-A) which can stably stop the rotor 3 even when the excitation of the coils is inhibited. The other is the coil excitation (A-B, C-D) which cannot stably stop the rotor 3 unless the excitation of the coils is maintained. Since the coil excitation control is conducted in the order of A-B, B-C, C-D and D-A as described earlier, there occurs, every other time, a coil excitation combination which enables the rotor 3 to stably stop even with the excitation of the coils inhibited.

Figure 4:
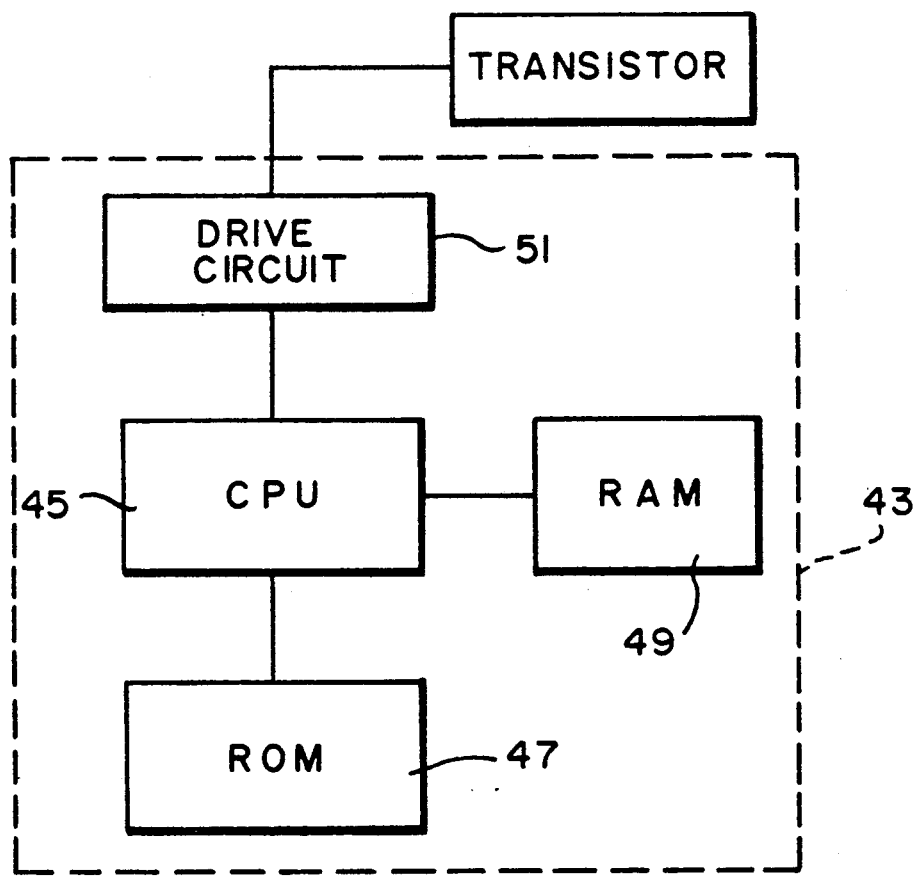
FIG. 4 is a block diagram of a controller in the drive circuit.

The structure of the controller 43 will be described below. As shown in FIG. 4, a CPU (Central Processing Unit) 45 is connected with a ROM (Read Only Memory) 47 having a program stored therein, and a RAM (Random Access Memory) 49 for storing data, such as the number of driving steps of the stepping motor. Also connected to the CPU 45 is a drive circuit 51 which outputs control signals to the individual transistors TrA, TrB, TrC and TrD in response to a command from the CPU 45.

Figure 5:
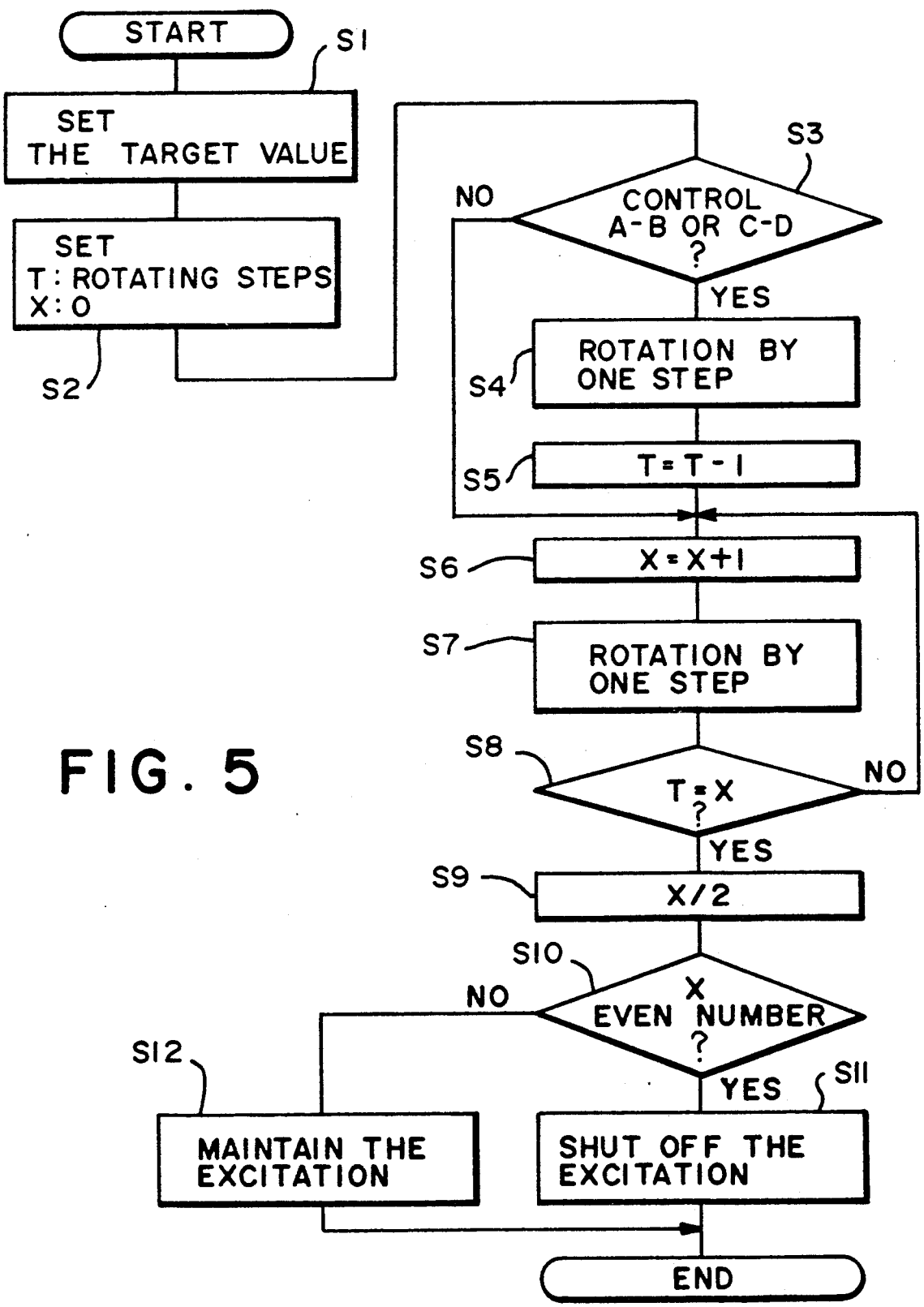
FIG. 5 is a flow chart illustrating routines for controlling the stepping motor.

This stepping motor is controlled according to the flow chart illustrated in FIG. 5. The individual control steps in FIG. 5 are given step numbers S1 to S11, "S1" meaning the first step, "S2" the second step, and so forth.

In step S1, the target value of the amount of the motor driven is set by an input device (not shown). In step S2, the CPU 45 computes the number of rotating steps of the rotor 3 corresponding to the target value, and stores the result as a variable T in the RAM 49. The CPU 45 also sets a variable X for counting the number of rotating steps, to zero. In step S3, the CPU 45 determines whether the combination of coils controlled with the rotor 3 presently being stopped is A-B or C-D, based on data acquired at the end of the previous control. If the coil combination is A-B or C-D, it means that the rotor 3 is stopped at the position illustrated in FIG. 3A. At this time, the CPU 45 sends a control signal to each transistor via the drive circuit 51 to rotate th rotor 3 by one step in a predetermined direction to the position shown in FIG. 3B (step S4). This is the position where the rotor 3 can stably hold the present position even when the excitation of the coils is inhibited. As the rotor 3 is rotated by one step in step S4, the CPU 45 decrements the variable T by one to correct T in step S5.

Subsequently, after incrementing the variable X by one (step S6), the CPU 45 sends a control signal via the drive circuit 51 to each transistor to rotate the rotor 3 by one step (step S7). If X has not reached T in step S8, the CPU 45 returns the control to step S6. Repeating the sequential process of steps S6, S7 and S8 rotates the rotor 3 by T steps.

When the rotor 3 is rotated by T steps, the CPU 45 divides the last value of X by two (step S9), and determines whether or not the resultant value (X/2) is the result of clear division by two, i.e., whether or not X is an even number or odd number (step S10).

If X is an even number, the rotor 3 should be positioned as illustrated in FIG. 3B. In this case, the rotor 3 is stable and will remain in place even when the excitation of the coils is inhibited. The CPU 45 therefore shuts off the excitation of the coils (step S11). If X is an odd number, the rotor 3 should be positioned as illustrated in FIG. 3A. In this case, the rotor 3 cannot be held there when the excitation of the coils is cut off. The CPU 45 therefore keeps exciting the coils (step S12). In this manner, the stepping motor waits with the coils excited or deexcited.

According to the present stepping motor, as described above, after rotating by a predetermined amount, the rotor 3 can accurately stop at the stop position and can stably wait there until the next rotation. In addition. it is unnecessary to always keep the coils excited at the waiting time of the stepping motor. The probability (frequency) of the coils being excited at the waiting time is typically ½. This stepping motor can therefore reduce the total power consumption compared with the conventional type which should keep exciting the coils even during the waiting time. According to this embodiment, the load of the drive circuit of the stepping motor is low, permitting various electronic components used in the drive circuit to be compact.

Although only one embodiment of the present invention has been described herein, it should be apparent to those skilled in the art that the present invention may be embodied in many other specific forms without departing from the spirit or scope of the invention. Particularly, it should be understood that, although the coils A and C, and the coils B and D are bifilar-wound in this embodiment, the individual coils A, B, C and D may be wound in monofilar manner with respect to the stators 9 and 11.

In exciting each coil when the rotor 3 is stopped in the above embodiment, the exciting current may be set slightly lower than what is required for the normal rotation of the rotor 3.

Therefore, the present examples and embodiments are to be considered as illustrative and not restrictive, and the invention is not to be limited to the details given herein, but may be modified within the scope of the appended claims.

What is claimed is:

1. A stepping motor comprising:
   a rotatable cylindrical rotor having a plurality of magnetized north poles and a plurality of magnetized south poles alternately arranged in a circumferential direction about the rotor;
   a stator having a plurality of stator teeth arranged about the rotor;
   coils for magnetizing the stator; and
   control means for controlling excitation of the coils to control the rotation of he rotor, the control means being arranged to rotate the rotor a predetermined amount to a selected stop position and then determine whether to maintain the excitation of the coils or to relinquish the excitation of the coils based upon the relative position of he stator teeth and the rotor poles in the stop position.

2. A stepping motor according to claim 1, wherein the control means maintains excitation of the coils when the stop position of the rotor is a position in which the rotor is not stable if excitation of the coils is relinquished, and cuts off the excitation of the coils when the rotor is positioned such that the rotor can retain the stop position even upon relinquishment of the excitation of the coils.

3. A stepping motor according to claim 2, wherein the control means computes a mutual positional relation between the rotor and the stator teeth based on the number of times the coils are switched.

4. A stepping motor according to claim 3, wherein the stator comprises a pair of magnetic poles each having the same number of teeth, and the magnetic poles are aligned along a common longitudinal axis and rotated with respect to said axis relative to each other so that their respective teeth are interleaved.

5. A stepping motor according to claim 4, wherein:
a pair of coils are wound on the stator such that exciting a first one of the pair of coils causes the first magnetic pole of the stator to be magnetized as an N pole and the second magnetic pole to be magnetized as an S pole, and exciting the second one of the pair of coils causes a reverse magnetization of the poles.

6. A stepping motor according to claim 5, wherein:
the motor further comprises a second stator positioned along said longitudinal axis;
said second stator has a second pair of coils; and
the control means simultaneously excites selected pairs of said coils a predetermined number of times in a predetermined order to rotate the rotor by a predetermined amount.

7. A stepping motor according to claim 6 wherein:
one of said magnetic poles on the first stator contacts one of the magnetic poles on the second stator; and
the control means inhibits the excitation of the coils when the contacting magnetic poles have the same polarity when the rotor is in the stop position.

8. A stepping motor according to claim 7, wherein the control means determines whether the contacting magnetic poles have the same polarity based on coil excitation conditions at the time the rotor starts rotating and the number of coil excitation steps required to complete rotation by the predetermined amount.

9. A stepping motor comprising:
a rotatable cylindrical rotor having a plurality of magnetized north and south poles alternately arranged in a circumferential direction about the rotor;
a stator journaled around the rotor, the stator including a plurality of stator teeth and a pair of magnetic poles each having the same number of associated stator teeth, the magentic poles being arranged in such a way that the stator teeth of one of the magnetic poles and those of the other magnetic pole are alternately positioned;
a pair of coils wound around the stator such that exciting a first one of the coils cause a first one of the magnetic poles to be magnetized as a north pole and the second magnetic pole to be magnetized as a south pole, and exciting the second coil causes a reverse magnetation of the poles; and
control means for controlling excitation of the coils to control the rotation of the rotor, the control means being arranged to rotate the rotor a predetermined amount to a selected stop position and then determined whether to maintain the excitation of the coils or to inhibit the excitation of the coils based upon the relative position between the stator teeth and the rotor poles in the stop position.

10. A stepping motor according to claim 9, wherein the control means maintains excitation of the coils when the stop position of the rotor is unstable and cuts off the excitation of the coils when the rotor is positioned in a stable stop position.

11. A stepping motor according to claim 10, further comprising:
a second stator that abuts against the first stator such that one of the magnetic pole of said first stator contacts one of the magnetic poles on the other stator;
a second pair of coils associated with said second stator; and
wherein the control means simultaneously excites selected pairs of said coils a predetermined number of times in a predetermined order to rotate the rotor by the predetermined amount, and inhibits the excitation of the coils when the contacting magnetic poles have the same polarity when the rotor is in the stop position.

12. A stepping motor according to claim 11, wherein the control means determines whether the contacting magnetic poles have the same polarity based on coil excitation conditions at the time the rotor starts rotating and the number of coil excitation steps required to complete rotation by the predetermined amount.

13. A method of controlling a stepping motor having a rotatable cylindrical rotor having a plurality of magnetized north poles and a plurality of magnetized south poles alternately arranged in a circumferential direction about the rotor, a stator having a plurality of teeth arranged about the rotor, and coils for magnetizing the stator, the method comprising the steps of:
rotating the rotor a predetermined amount to a selected stop position by continuous excitation of the coils; and
maintaining the excitation of the coils when the stop position of the rotor is a position in which the rotor is not stable when excitation of the coils is cut off, and cutting off the excitation of the coils when the rotor is positioned such that the rotor can retain the stop position even upon cutting off of the excitation of the coils.

14. The method of controlling a stepping motor according to claim 13, wherein the decision as to whether to maintain the excitation of the coils is based on the number of times the coils are switched.

* * * * *

UNITED STATES PATENT AND TRADEMARK OFFICE
CERTIFICATE OF CORRECTION

PATENT NO. : 5,132,603
DATED : July 21, 1992
INVENTOR(S) : Satoshi Yoshimoto It is certified that error appears in the above-identified patent and that said Letters Patent is hereby corrected as shown below:

Claim 1, column 6, line 57, "he" should be "the".

Claim 1, column 6, line 62, "he" should be "the".

Claim 9, column 7, line 51, "magentic" should be "magnetic".

Claim 9, column 7, line 56, "cause" should be "causes".

Claim 9, column 8, line 7, "determined" should be "determine".

Claim 11, column 8, line 19, "pole" should be "poles".

Claim 11, column 8, line 28, "the" (third occurrence) should be "said".

Signed and Sealed this

Thirty-first Day of August, 1993

*Attest:*

BRUCE LEHMAN

*Attesting Officer*   *Commissioner of Patents and Trademarks*